United States Patent [19]

Nishi

[11] Patent Number: 5,724,544
[45] Date of Patent: Mar. 3, 1998

[54] IC MEMORY CARD UTILIZING DUAL EEPROMS FOR IMAGE AND MANAGEMENT DATA

[75] Inventor: Seiki Nishi, Tokyo, Japan

[73] Assignee: Fuji Photo Film Company, Limited, Kanagawa, Japan

[21] Appl. No.: 361,476

[22] Filed: Dec. 22, 1994

Related U.S. Application Data

[63] Continuation of Ser. No. 832,394, Feb. 7, 1992, abandoned.

[30] Foreign Application Priority Data

Feb. 18, 1991 [JP] Japan ................... 3-043969

[51] Int. Cl.$^6$ ................... G06K 19/06; G06F 12/00
[52] U.S. Cl. ................... 395/442; 395/430; 395/497.02; 395/405; 235/492
[58] Field of Search ................... 395/405, 430, 395/442, 497.01, 497.03, 497.02; 235/492; 365/230.03

[56] References Cited

U.S. PATENT DOCUMENTS

| | | | |
|---|---|---|---|
| 4,654,829 | 3/1987 | Jiang et al. | 365/229 |
| 4,887,234 | 12/1989 | Iijima | 395/497.04 |
| 4,907,231 | 3/1990 | Watanabe et al. | 371/24 |
| 5,056,009 | 10/1991 | Mizuta | 395/490 |
| 5,200,600 | 4/1993 | Shinagawa | 235/492 |
| 5,226,145 | 7/1993 | Moronago et al. | 395/412 |

*Primary Examiner*—Jack A. Lane

[57] ABSTRACT

An IC memory card has a byte rewriting type EEPROM implementing a supervisory area for storing supervisory data which should be rewritten byte by byte, and a flushing type EEPROM implementing a data area for storing picture data or similar data which are usually generated in a great amount. When an address for writing data in the supervisory area is sent from a host processor to the card, an address identifying section determines the value of the address and activates a memory controller to write the data in the supervisory area. When an address for writing picture data is sent from the host processor, the address identifying section determines the value of the address and activates another memory controller associated with the data area to thereby write the picture data in the data area.

13 Claims, 3 Drawing Sheets

Fig. 2

| | ADDRESS | NUMBER OF BYTES | CONTENT |
|---|---|---|---|
| BYTE REWRITING TYPE EEPROM HEADER AREA | 0 | 1 | CARD NO. |
| | 1 – 11 | 10 | LABEL |
| | 12 – 13 | 2 | LAST OCCUPIED ADDRESS |
| | 14 | 1 | NUMBER OF RECORDED PICTURES |
| | 15 – 16 | 2 | START ADDRESS OF PICTURE 1 |
| | 17 – 18 | 2 | END ADDRESS OF PICTURE 1 |
| | ----- | ----- | ----- |
| | 31 – 32 | 2 | START ADDRESS OF PICTURE 10 |
| | 33 – 34 | 2 | END ADDRESS OF PICTURE 10 |

Fig. 3

| | ADDRESS | NUMBER OF BYTES | CONTENT |
|---|---|---|---|
| FLUSHING TYPE EEPROM PICTURE DATA AREA | 35 – 6585 | — | 1ST PICTURE DATA |
| | ---- | ---- | ---- |
| | 58985 – 65535 | — | 10TH PICTURE DATA |

IC MEMORY CARD UTILIZING DUAL EEPROMS FOR IMAGE AND MANAGEMENT DATA

This application is a continuation of application Ser. No. 07/832,394 filed on Feb. 7, 1992, now abandoned.

BACKGROUND OF THE INVENTION

1. Field of the Invention

The present invention relates to an IC (Integrated Circuit) memory card for storing picture data, character data or similar data.

2. Description of the Related Art

Today, a memory card using a semiconductor memory is predominant over a floppy disk or diskette as means for recording data such as picture data generated by an electronic still camera or character data generated by a word processor, since the former is far smaller in size than the latter. It has been customary with a memory card for such an application to implement the semiconductor memory as an SRAM (Static Random Access Memory) which promotes rapid data reading and writing operations. However, because an SRAM is a volatile semiconductor memory, a memory card with an SRAM needs a back-up battery for preventing data from disappearing. Another problem is that an SRAM capable of storing a great amount of data such as picture data is expensive, increasing the overall cost of an IC memory card implemented thereby.

In light of the above, an IC memory card with an EEPROM (Electrically Erasable Programmable Read Only Memory) which is nonvolatile and, therefore, does not need a back-up battery and is inexpensive is now under investigation. An EEPROM is capable of holding data therein for more than ten years without a battery. Some advanced EEPROMs are comparable with an SRAM in respect of the reading and writing rates and are about one-fourth the cost of an SRAM.

EEPROMs are generally classified into two types, i.e., an EEPROM of the type erasing or flashing all the data at a time or erasing single page, sector or similar block of data at a time, and an EEPROM of the type erasing a single byte of data at a time. Flashing type EEPROMs include HN29C101 available from HITACHI (Japan) and M5M28F101 available from MITSUBISHI (Japan), while byte rewriting type EEPROMs include MBM28C256 available from FUJITSU (Japan) and µPD28C256 available from NEC (Japan). However, both the byte rewriting type EEPROMs and the flashing type EEPROMs have some problems left unsolved, which will be desribed as follows.

A byte rewriting type EEPROM is more expensive than a flashing type EEPROM when it comes to large capacity applications. Specifically, when an IC memory card for storing a great amount of picture data or similar data is implemented by this type of EEPROM, the memory card is expensive although it can be accessed in the same manner as an SRAM. On the other hand, an IC memory card using a flashing type EEPROM does not allow only part of the data stored therein to be readily rewritten although it is less expensive than a memory card with a byte rewriting type EEPROM. Assuming that supervisory data including addresses where data are stored are recorded together with picture data, it is necessary to rewrite the supervisory data on a byte basis. In such a case, the flashing type EEPROM would erase even the data which should not be rewritten.

SUMMARY OF THE INVENTION

It is, therefore, an object of the present invention to provide an IC memory card which is inexpensive and allows supervisory data or similar data stored therein to be rewritten with ease.

In accordance with the present invention, an IC memory card for receiving first data to be recorded and second data subordinate to the first data and needing byte-by-byte rewriting from a host processor and storing the first and second data therein comprises a first memory device having a large capacity and provided with a first memory area for storing the first data, a second memory device rewritable on a byte basis and provided with a second memory area for storing the second data, and a control section for controlling the first and second memory devices for writing or reading the first and second data in or out of the first and second memory devices, respectively.

BRIEF DESCRIPTION OF THE DRAWINGS

The objects and features of the present invention will become more apparent from the consideration of the following detailed description taken in conjunction with the accompanying drawings in which:

FIG. 2 shows a specific format of a supervisory area included in the embodiment; and FIG. 3 shows a specific format of a data also included in the embodiment.

DESCRIPTION OF THE PREFERRED EMBODIMENTS

Figure 1:
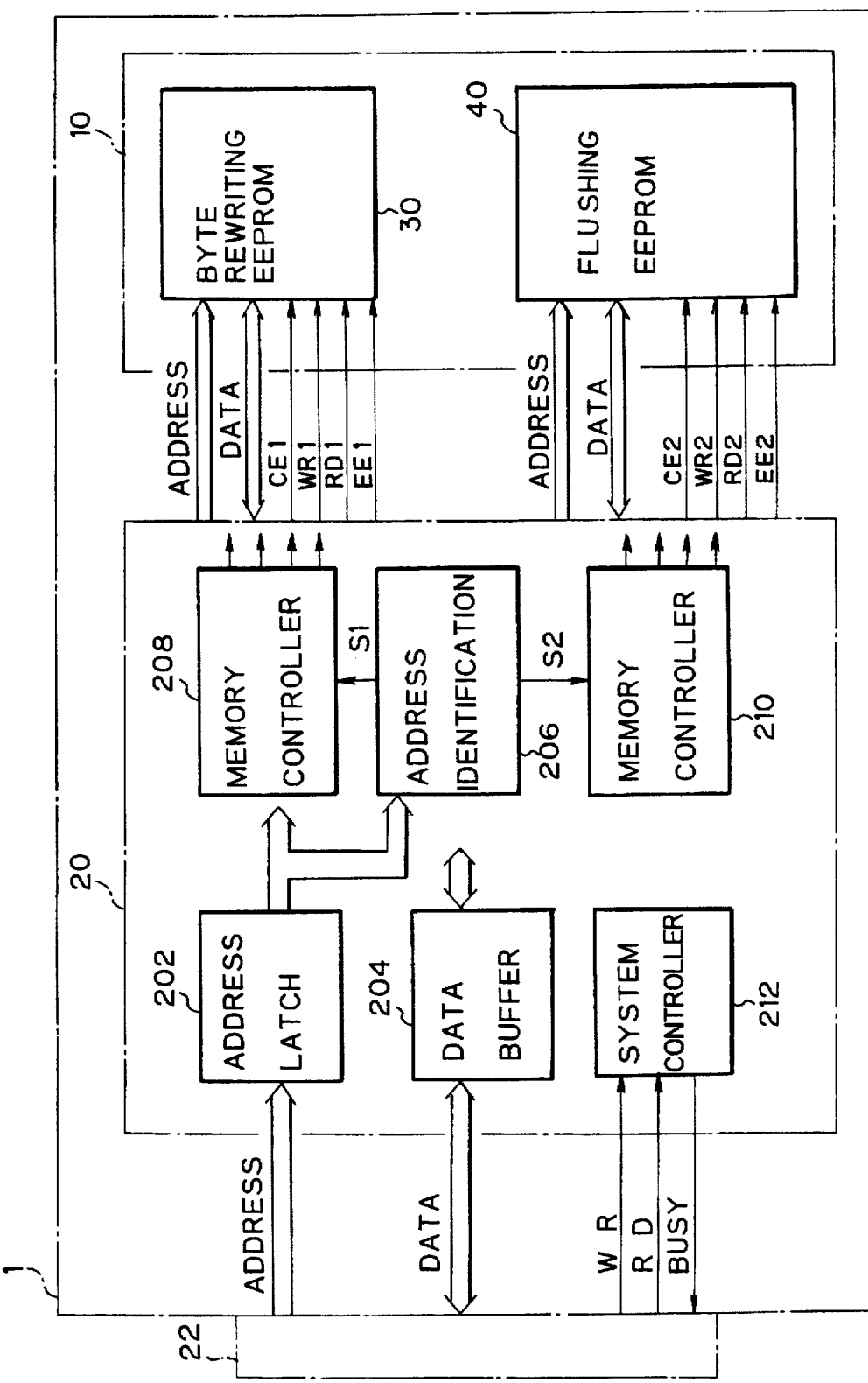
FIG. 1 is a block diagram schematically showing a preferred embodiment of the IC memory card in accordance with the present invention.

Referring to FIG. 1 of the drawings, an IC memory card embodying the present invention is shown and generally designated by the reference numeral 1. As shown, the memory card 1 is generally made up of a memory section 10 for storing data, and a control section 20 for controlling the write-in and read-out of data from the memory section 10. The memory card is connectable to an electronic still camera, playback device associated with such a camera, or similar host processor, not shown, via a connector 22.

The memory section 10 has two different types of EEPROMs therein, i.e., a byte rewriting type EEPROM 30 and a flashing type EEPROM 40. The byte rewriting type EEPROM 30 has therein a supervisory area for storing various kinds of supervisory data, e.g., the data relating to the memory card 1 and the data relating to data recording. On the other hand, the flashing type EEPROM 40 has a data area for storing picture data or similar data as distinguished from the supervisory data. In a system for recording, for example, picture data generated by an electronic still camera, the above-mentioned supervisory area is usually called a header area and will be so referred to hereinafter.

As shown in FIG. 2, the header area has consecutive logical addresses "0" to "34" each being constituted by one byte, i.e., eight bits. The address "0" stores a particular number assigned to the memory card 1 for distinguishing one particular memory card from the other cards. This number, or card number, is selected by the user. The addresses "1" to "11" are capable of accommodating ten types of data, e.g., alphanumeric data representing a label. Also entered by the user, the label may be indicative of the purpose of use of the memory card 1 and the user's name. The addresses "12" and "13" indicate up to which address the flushing type EEPROM 40 has stored data in the data area thereof, i.e., the last one of the occupied addresses of the data area. Specifically, the last one of the occupied addresses is sent from the host processor to the memory card 1 after the write-in of picture data. The address "14" stores data representative of the number of pictures stored in the data area of the flushing type EEPROM 40. Specifically, data representative of the number of pictures successively taken is set from the host processor to the memory card 1, added to existing data representative of the number of pictures taken in the past, and then rewritten to the address "14". Further, the addresses "15" to "34" store the start addresses and end addresses of the picture data sequentially written to the data area. Two bytes are allocated to each of the start addresses and end addresses.

The byte rewriting type EEPROM 30 with such a header area is inexpensive because the capacity required of the header area is as small as thirty-four bytes. For example, the byte rewriting type EEPROM 30 may be implemented by MBMμ28C256 available from Fujitsu (Japan) or μPD28C256 available from NEC (Japan). As the user connects the memory card 1 to the host processor and then turns on a particular switch provided on the host processor, all the supervisory data are read out of the header area and transferred from the card 1 to the host processor. In response, the host processor writes or reads picture data in or out of the memory card 1 by referencing the supervisory data.

As shown in FIG. 3, the flushing type EEPROM 40 has the data area thereof formatted in, for example, ten blocks capable of storing picture data representative of ten consecutive pictures. In the illustrative embodiment, 6,550 bytes are allocated to each block. Specifically, an address "35" which follows the last address of the header area shown in FIG. 2, to an address "6,585" are assigned to the first picture data block. In the same manner, 6,550 addresses are assigned to each of the second and successive picture data blocks. An address "58,985" to an address "65,535" are assigned to the tenth picture data block. The flushing type EEPROM 40 is capable of erasing all the data stored therein or a block of data representative of one or more pictures collectively at a time. Although the flushing type EEPROM 40 needs a great capacity since picture data are to be stored therein, this flushing type of EEPROM can be fabricated at low cost and, therefore, the entire card with such a EEPROM is inexpensive. Regarding the flushing type EEPROM 40, use may be made of HN29C101 available from HITACHI (Japan) or M5M28F101 available from MITSUBISHI (Japan).

Referring again to FIG. 1, the control section 20 controls the address for writing or reading supervisory data in or out of the byte rewriting type EEPROM 30 or for writing or reading picture data in or out of the flushing type EEPROM 40. In the illustrative embodiment, the control section 20 has, among others, a function of determining whether an address sent from the host processor is the last address "34" or smaller address of the header area shown in FIG. 2, or whether an address is the first address "35" or greater address of the data area shown in FIG. 3, and accessing either of the EEPROMs 30 and 40 on the basis of the result of decision. This function will be referred to as an address control function hereinafter.

As shown in FIG. 1, the control section 20 is made up of an address latch 202, a data buffer 204, and address identification 206, memory controllers 208 and 210, and a system controller 212. The address latch 202 latches, in response to a timing signal fed from the system controller 212, an address which i sent from the host processor to the memory card 1 via the connector 22. The data buffer 204 temporarily stores data sent from the host processor to the memory card 1 via the connector 22 to be written to the memory card 1 or data read out of the memory section 10. The data buffer 204 may be a capacity great enough to store one byte of data. The address identification 206 reads the address held in the address latch 202 and determines whether the address is the address "34" or smaller address of the header area or whether the address is the address "35" or greater address of the data area. If the address is the address "34" or smaller address, the address identification 206 sends a select signal S1 to the memory controller 208. If the address is the address "35" or greater address, the address identification 206 sends a select signal S2 to the memory controller 210. In this sense, the address identification 206 plays the role of a comparator.

The memory controller 208 accesses the byte rewriting type EEPROM 30. Specifically, on receiving the select signal S1 from the address identification 206, the memory controller 208 is activated and sends a chip enable signal CE1 to the byte rewriting type byte rewriting type EEPROM 30 while sending a write signal WR1 or a read signal RD1 to the EEPROM 30 under the control of the system controller 212. When the access to the memory controller 208 is for rewriting data, the memory controller 208 delivers an erase signal EE1 to the byte rewriting type EEPROM 30 before the write signal WR1 so as to erase data existing in the address of interest. Likewise, the memory controller 210 is activated by the select signal S2 from the address identification 206. Then, the memory controller 210 sends a chip enable signal CE2 and a write signal WR2 or a read signal RD2 to the flushing type EEPROM 40. Before rewriting the data existing in the flushing type EEPROM 40 for the first time, the memory controller 210 delivers an erase signal EE2 to the flushing type EEPROM 40 to erase all the data stored in the data area.

The system controller 212 controls the various blocks 202–210 included in the memory section 20 in response to control signals sent from the host processor. While controlling the blocks 202–210, the system controller 212 continuously sends a signal BUSY to the host processor to report that processing is under way in the memory card 1. Specifically, as the system controller 212 receives a write signal WR from the host processor together with an address, the system controller 212 feeds a timing signal to the address latch 202 for latching the address therein in response to the write signal WR. After the address has been latched in the address latch 202, the system controller 212 activates the address identification 206 to cause the address identification 206 to identify the address having been latched in the address latch 202. At the same time, the system controller 212 reads the address out of the address latch 202 and transfers the address to the EEPROMs 30 and 40. Subsequently, on receiving a write signal WR or a read signal RD from the host processor together with data, the system controller 212 transfers such signals to the memory controllers 208 and 210 and sends a timing signal to the data buffer 204 to write the data therein. In the event of data rewriting, the system controller 212 erases data by controlling the memory controllers 208 and 210 while sending a signal BUSY to the host processor.

The operations of the IC memory card 1 having the above construction will be described hereinafter, taking a data writing procedure as an example.

First, the operator connects the connector 22 of the memory card 1 to the address/data bus and control bus provided in a host processor to thereby operatively mount the memory card 1 on the host processor. Next, the operator switches on the power source of the host processor and then performs a predetermined operation. As a result, the host processor sequentially sends addresses to the memory card 1 for reading out the supervisory data. The addresses are each held in the address latch 202. Since these addresses are not greater than the address "34", the address identification 206 delivers a select signal S1 to the memory controller 208. In response, the memory controller 208 feeds a chip enable signal CE to the byte rewriting type EEPROM 30. On receiving a read signal RD from the host processor, the system controller 212 feeds a read signal RD1 to the flushing type EEPROM 40 via the memory controller 208. In response to the read signal RD1, the supervisory data stored in the header area of the flushing type EEPROM 30 are sequentially read out and sent to the host processor via the data buffer 204. The host processor writes or reads picture data by referencing the supervisory data sequentially sent thereto from the memory card 1. On reading all the supervisory data, the host processor is ready to operate in response to the operator's manipulation.

To record picture data in the memory card 1, the host processor sends addresses for writing the picture data to the memory card 1. When the first picture data should be recorded in the memory card 1, the host processor sends the first address "35" of the data area to the memory card 1 together with a write signal WR. The write signal WR is a control signal for causing the memory card 1 to read the address. In response to the signal WR, the system controller 212 feeds a timing signal to the address latch 202 with the result that the address latch 202 latches the address "35".

After sending the timing signal to the address latch 202, the system controller 212 activates the address identification 206. Then, the address identification 206 reads the address having been latched in the address latch 202 and determines the value of the address. At this instant, since the address is "35", the address identification 206 sends a select signal S2 to the memory controller 210. In response, the memory controller 210 feeds a chip enable signal CE2 to the flushing type EEPROM 40. As a result, the flushing type EEPROM 40 receives the address having been latched in the address latch 202 and has the address thereof accessed. Subsequently, the system controller 212 controls the memory controller 210 to erase data existing in the flushing type EEPROM 40. Specifically, the memory controller 210 feeds an erase signal EE2 to the flushing type EEPROM 40 under the control of the system controller 212, thereby erasing the data stored in the flushing type EEPROM 40. During such a procedure, the system controller 212 continuously sends a signal BUSY to the host processor to prevent the host processor from sending data to the memory card 1.

On completing the erasure, the system controller 212 cancels the signal BUSY. Then, the host processor sends the first eight bits of picture data and a write signal WR to the memory card 1. In response to the write signal WR, the system controller 212 feeds a timing signal to the data buffer 204 and transfers the write signal to the memory controller 210. The memory controller 210 in turn delivers a write signal WR2 to the flushing type EEPROM 40. As a result, the first eight bits of data of the picture are written to the first picture block of the data area of the flushing type EPROM 40 via the data buffer 204. Subsequently, the memory controller 210 increments the address of the flushing type EEPROM 40. On receiving the next eight bits of the first picture data from the host processor, the memory controller 210 feeds a write signal WR2 to the flushing type EEPROM 40 to thereby write the data in the address "36". This is repeated until all the first picture data have been written to the first picture block of the flushing type EEPROM 40.

Next, the host processor executes data processing for rewriting supervisory data relating to the recording of the first picture data. To begin with, the host processor sends a write signal WR and the address "12" for rewriting the last one of the occupied addresses to the memory card 1. In response to the write signal WR, the system controller 212 feeds a timing signal to the address latch 202 to thereby latch the address "12" Subsequently, the system controller 212 activates the address identification 206 to cause the address identification 206 to identify the address "12" having been latched in the address latch 202. At this instant, since the address "12" is smaller than the address "34", the address identification 206 delivers a select signal S1 to the memory controller 208. As a result, the memory controller 208 sends a chip enable signal CE1 to the byte rewriting type EEPROM 30 to thereby activate the byte rewriting type EEPROM 30 and then feeds the address having been latched in the latch 202 to the byte rewriting type EEPROM 30. Thereafter, the memory controller 208 delivers an erase signal EE1 to the byte rewriting type EEPROM 30 with the result that the last one of the occupied addresses is erased. While such erasure is under way, the system controller 212 sends a signal BUSY to the host processor to prevent the host processor from sending data to the memory card 1.

As the erasure completes, the host processor sends the first byte of the last address to be used (address "6585" in this case) to the memory card 1 and together with a write signal WR. In Response, the system controller 212 transfers the write signal WR to the memory controller 208 and feeds a timing signal to the data buffer 204. As a result, the last address to be used is stored in the data buffer 204 while a write signal WR1 is fed from the memory controller 208 to the byte rewriting type EEPROM 30. This causes the first byte of the address "6585" to be written to the address "12" of the header area. Subsequently, the memory controller 208 increments the address and, on receiving the second byte of the address "6585" from the host processor, writes the second byte of the address "6585" in the address "13". The host processor sends data "1" representative of the number of recorded pictures to the memory card 1 after the second byte of the address "6585", whereby data "1" is written to the address "14" of the header area. Subsequently, the host processor sends the start address "35" of the picture 1 to the memory card 1. This start address "35" is written to the address "15" and "16" of the header area. In the same manner, the end address "6585" of the picture 1 is written to the addresses "17" and "18".

When an address for recording the second picture data is sent from the host processor to the memory card 1, the procedure described above is repeated, i.e., the address identification 206 identifies the latched address, and the memory controller 210 is activated. As a result, the second picture data is written to the second picture data block of the data area of the flushing type EEPROM 40. After the second picture data has been fully stored, the previously described procedure is repeated to rewrite the last occupied address, the number of recorded pictures, and start and end addresses of the picture 2 stored in the header area of the byte rewriting type EEPROM 30. In the same manner, the header area is rewritten every time one of the third to tenth picture data is written to the picture data area.

As stated above, in the illustrative embodiment, the flushing type EEPROM 40 and the byte rewriting type EEPROM 30 implement respectively a data area for storing picture data and a header area for storing supervisory data associated with the picture data. Therefore, the header area which should be rewritten byte by byte can have a particular portion thereof rewritten after picture data has been written in the data area. The host processor has only to update only a necessary portion and write the necessary portion in the header area. Since the memory device, which constitutes the data area, has a decisive influence on the cost of the memory card 1 and is implemented by the flushing type EEPROM 40, the memory card 1 is attainable with a far lower cost than conventional ones.

In summary, the present invention provides an IC memory card having a first memory device for storing supervisory data or similar auxiliary data which should be rewritten on at least a byte basis, and a second memory device for storing a great amount of main data as picture data. The second memory device is implemented by a flushing type EEPROM or a similar large capacity device to realize an inexpensive IC memory card. When the first memory device is constituted by a byte rewriting type EEPROM, the auxiliary data, which should be rewritten at least byte by byte, can be rewritten and recorded efficiently, as with an SRAM. Therefore, the IC memory card of the present invention is more economical than a conventional IC memory card using an SRAM and allows data to be rewritten.

While the present invention has been described with reference to the particular illustrative embodiment, it is not to be restricted by the embodiment but only the appended claims. It is to be appreciated that those skilled in the art can change or modify the embodiment without departing from the scope and spirit of the present invention. For example, the header area and data area shown in FIGS. 2 and 3, respectively, are only illustrative. The data area, for example, may be modified such that picture data are non-sequentially written to any idle addresses of the data area. In such a case, picture data representative of a single picture may even be dispersed in the data area if supervisory data representative of the relation betwen dispersed picture data is written to the header area. While the foregoing description has concentrated on picture data, the present invention is, of course, practicable with any other data such as character data.

What is claimed is:

1. An IC memory card for receiving first data to be recorded and second data associated with to said first data, said second data being processed on a byte-by-byte basis from a host processor and said first data and second data being stored in said IC memory card, wherein said first data includes picture data and said second data includes supervisory data for recording addresses where the picture data is recorded in association with said first data and other supervisory data, said IC memory card comprising:

a first memory device having a first memory area sufficient for storing a predetermined amount of said first data and provided with a first memory area for storing said first data, the predetermined amount of said first data being much larger than an amount of said second data and said second data being rewritten in units of bytes;

a second memory device rewritable on a byte-by-byte basis and provided with a second memory area for storing said second data, wherein the first memory area has a larger capacity than the second memory area;

control means for controlling said first memory device and said second memory device for writing or reading said first data and said second data in or out of said first memory device and said second memory device, respectively;

wherein said first memory device comprises a flashing type EEPROM; and said second memory device comprises a byte rewriting type EEPROM.

2. A memory card in accordance with claim 1, wherein said control means determines, on receiving an address associated with said second data from the host processor, the value of said address, selects said second memory device, accesses predetermined addresses of said second memory area, and executes address control for writing or reading said second data in or out of said second memory area, said control means, on receiving an address associated with said first data from said host processor, determining the value of said address, selecting said first memory device, accessing predetermined addresses of said first memory area, and executing address control for writing or reading said first data in or out of said first memory area.

3. A memory card in accordance with claim 2, wherein addresses of said first memory area of said first memory device and addresses of said second memory area of said second memory device are serial, the host processor designating a location for storing data by using said serial addresses, said control means executing address control by using said serial addresses.

4. A memory card in accordance with claim 1 wherein said first data and said second data comprise respectively picture data and supervisory data for recording addresses where said picture data are recorded and other supervisory data in association with said first data.

5. An IC memory card for receiving recording data, supervisory data associated with said recording data, and an address associated therewith from a host processor and for storing the recording data and the supervisory data, said IC memory card comprising:

a first memory for storing a predetermined number of blocks of the recording data;

a second memory for storing the supervisory data which is rewritable on a byte-by-byte basis, an amount of the supervisory data, to be rewritten in units of bytes, being much smaller than the predetermined number of blocks of the recording data, wherein a memory capacity of said first memory is larger than a memory capacity of said second memory;

control means for determining whether said address corresponds to said first memory or said second memory, selecting said first or second memory corresponding to said address, and writing and reading the recording data or the supervisory data in and out of the selected first or second memory;

wherein said first memory comprises a flashing type EEPROM; and said second memory comprises a byte rewriting type EEPROM.

6. An IC memory and in accordance with claim 5, wherein said recording data comprises picture data.

7. An IC memory card in accordance with claim 5, wherein said recording data comprises character data.

8. An IC memory card in accordance with claim 5, wherein said supervisory data comprises card number data, label data, data corresponding to the last occupied address of said first memory, data corresponding to said predetermined number of blocks of the recording data, and data corresponding to start and end addresses for each of said predetermined number of blocks of the recording data.

9. An IC memory card in accordance with claim 5, wherein said control means comprises:

a system controller for receiving write, read and busy signals from said host processor and generating a timing signal responsive thereto;

a data buffer for temporarily storing the supervisory and recording data from said hose processor and said first and second memories;

an address latch for latching said address from said host processor in response to said timing signal generated by said system controller;

an address identifier for reading said address latched by said address latch, determining whether said address corresponds to said first memory or said second memory and generating first and second select signals based on said address; and first and second memory controllers for controlling said first and second memories responsive to said first and second select signals respectively.

10. An IC memory card in accordance with claim 9, wherein said first and second memory controllers generate first and second chip enable signals, first and second write signals, first and second read signals and first and second erase signals respectively for controlling said first and second memories.

11. A method for storing recording data and supervisory data on an IC card, comprising the steps of:

(a) generating the recording data and supervisory data and an address associated therewith by a host processor;

(b) storing a predetermined number of blocks of the recording data in a first memory;

(c) storing the supervisory data, which is rewritable on a byte-by-byte basis, in a second memory, an amount of the supervisory data, to be rewritten in units of bytes, being much smaller than the predetermined number of blocks of the recording data wherein a memory capacity of the first memory is larger than a memory capacity of the second memory;

(d) determining whether said address corresponds to said first or second memory;

(e) selecting said first or second memory corresponding to said address determination at said step (d);

(f) writing and reading the recording data or the supervisory data in and out of said first or second memory selected at said step (e);

wherein said step (b), the predetermined number of blocks of the recording data are stored in a flashing type EEPROM; and said step (c), the supervisory data is stored in a byte rewriting type EEPROM.

12. A method in accordance with claim 11, further comprising the steps of:

(g) receiving write, read and busy signals from said host processor and generating a timing signal responsive thereto;

(h) temporarily storing the supervisory and recording data from said host processor and said first and second memories;

(i) latching said address from said host processor in response to said timing signal generated at said step (g);

(j) reading said address latched at said step (i), determining whether said address corresponds to said first memory or said second memory, and generating first and second select signals based on said address; and (k) controlling said first and respond memories responsive to said first and second select signals respectively.

13. A method in accordance with claim 12, wherein said step (k) generates first and second chip enable signals, first and second write signals, first and second read signals and first and second erase signals for controlling said first and second memories, respectively.

* * * * *

UNITED STATES PATENT AND TRADEMARK OFFICE
CERTIFICATE OF CORRECTION

PATENT NO : 5,724,544
DATED : March 3, 1998
INVENTOR(S): Seiki NISHI

It is certified that error appears in the above-identified patent and that said Letters Patent is hereby corrected as shown below:

IN THE LETTERS PATENT:

On the face of the Patent, in the Figure, change "FLUSHING" to --FLASHING--.

Drawing Figure 1, change "FLUSHING" to --FLASHING--.

Drawing Figure 3, change "FLUSHING" to --FLASHING--.

IN THE ABSTRACT:

Line 3, change "flushing" to --flashing--.

IN THE SPECIFICATION:

Column 3, line 2, change "flushing" to --flashing--;

line 23, change "flushing" to --flashing--;

line 33, change "flushing" to --flashing--;

line 36, change "flushing" to --flashing--;

line 38, change "flushing" to --flashing--;

line 40, change "flushing" to --flashing--; and

UNITED STATES PATENT AND TRADEMARK OFFICE
CERTIFICATE OF CORRECTION

PATENT NO : 5,724,544
DATED : March 3, 1998
INVENTOR(S) : Seiki NISHI

It is certified that error appears in the above-identified patent and that said Letters Patent is hereby corrected as shown below:

line 47, change "flushing" to --flashing--.

Column 4, line 27, change "flushing" to --flashing--;

line 28, change "flushing" to --flashing--; and line 30, change "flushing" to --flashing--.

Column 5, line 7, change "flushing" to --flashing--;

line 10, change "flushing" to --flashing--;

line 34, change "flushing" to --flashing--;

line 35, change "flushing" to --flashing--;

line 39, change "flushing" to --flashing--;

line 41, change "flushing" to --flashing--;

line 43, change "flushing" to --flashing--;

line 54, change "flushing" to --flashing--;

UNITED STATES PATENT AND TRADEMARK OFFICE
CERTIFICATE OF CORRECTION

PATENT NO : 5,724,544
DATED : March 3, 1998
INVENTOR(S) : Seiki NISHI

It is certified that error appears in the above-identified patent and that said Letters Patent is hereby corrected as shown below:

line 56, change "flushing" to --flashing--;

line 58, change "flushing" to --flashing--;

line 61, change "flushing" to --flashing--; and line 64, change "flushing" to --flashing--.

Column 6, line 51, change "flushing" to --flashing--; and line 60, change "flushing" to --flashing--.

Column 7, line 3, change "flushing" to --flashing--;

line 11, change "flushing" to --flashing--; and line 32, change "betwen" to --between--.

Signed and Sealed this

Twelfth Day of January, 1999

Attest:

Attesting Officer      *Acting Commissioner of Patents and Trademarks*